G. SHELTON.
FENCE POST.
No. 185,584.　　　　　　　　　　Patented Dec. 19, 1876.
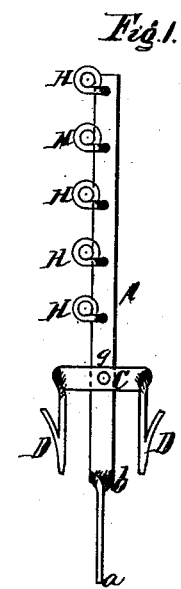
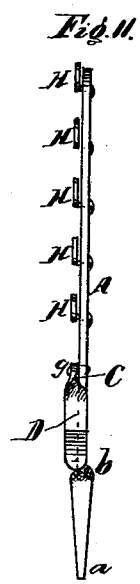
Witnesses:
Franklin Barritt.
Richard Gerner
Inventor:
Gillum Shelton,
Per. Henry Gerner,
Att'y.

UNITED STATES PATENT OFFICE.

GILLUM SHELTON, OF NORMAL, ILLINOIS.

IMPROVEMENT IN FENCE-POSTS.

Specification forming part of Letters Patent No. 185,584, dated December 19, 1876; application filed November 14, 1876.

*To all whom it may concern:*

Be it known that I, GILLUM SHELTON, of Normal, McLean county, State of Illinois, have invented a new and useful Improvement in Fence-Posts; and I hereby declare that the following is a clear and exact description, which will enable others to make and use my improved fence-post, reference being had to the accompanying drawings, making a part of this specification.

The object of my invention is to produce a fence-post to be used more especially in the construction of wire fences. The post is made of iron. It can, however, be made of iron and wood, if it is so desired. This fence-post is driven into the ground so far that the soil will cover the holder of the two barbs, which are placed on the ends of the same. The post will then stand firm in the ground, and cannot be drawn up without rocking the same to and fro, so that the barbs will loosen their hold in the soil. The post at its lower end is given a twist, so as to enable it to hold itself in the soil better. To the side and upper part of the post are fastened eyes or hooks, into which the wires of the fence are laid.

Referring to the drawings, Figure 1 is a front view of a fence-post embodying my invention. Fig. 2 is a side view of the same.

A is the fence-post, with pointed end $a$, which is twisted at $b$. C is the holder for the two barbs D D, which are forged on the end of the holder. This holder is fastened to the fence-post at $g$. H H are the eyes or hooks, fastened to the side of the fence-post.

Having thus described my invention, I desire to claim—

The fence-post A, with the pointed end $a$, and twisted at $b$, in combination with the barb-holder C, with the two barbs D D, substantially as described.

GILLUM SHELTON.

Witnesses:
 THOS. SLADE,
 WILLIAM P. MCMURRY.